Patented Aug. 14, 1928.

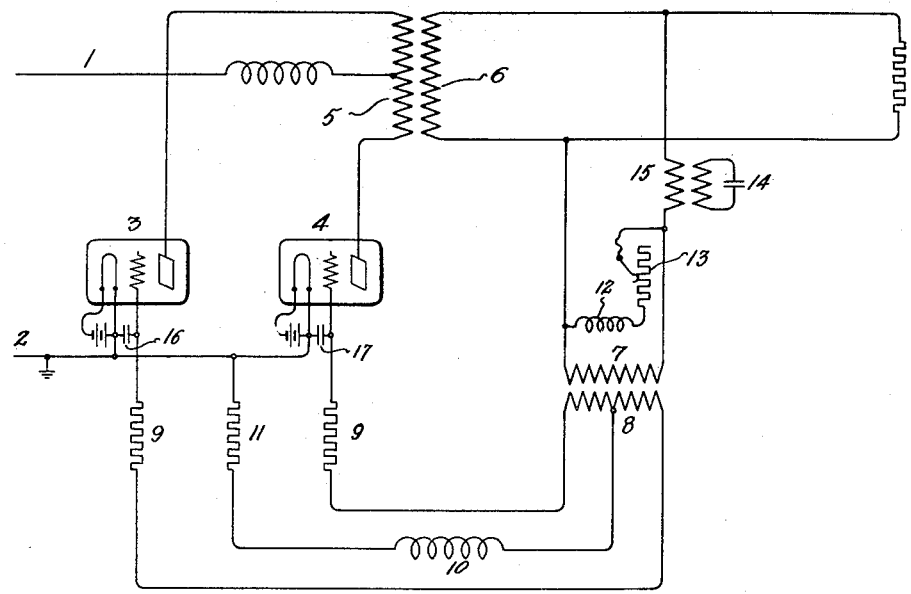
Inventor:
Ernst F. W. Alexanderson,
by *(signature)*
His Attorney.

1,680,758

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF DISTRIBUTION.

Application filed February 11, 1925. Serial No. 8,571.

My present invention relates to a system of electrical distribution in which it is desired to change direct current of one voltage into alternating current of another voltage, and more particularly to means for determining the frequency of the generated alternating current.

In converting direct into alternating current by means of thermionic valves, it is usual to connect the valves to the direct current source through the primary winding of a transformer. Means are then employed to determine the frequency of the generated alternating current, such means being generally a capacity unit connected across the primary winding.

It is the object of my invention to provide means whereby the frequency of the alternating current in a system such as described above may be determined independently of condensers.

The novel features which I believe to be characteristic of my invention are set forth with particularity in the appended claims. My invention itself, however, both as to its organization and method of operation, will best be understood by reference to the following description taken in connection with the accompanying drawing, in which the figure shows diagrammatically one arrangement whereby my invention may be carried into effect.

I have indicated in the figure a system in which direct current from mains 1 and 2 is supplied through the plate circuits of the electric valves 3 and 4 to the primary winding 5 of a transformer, having a secondary winding 6 connected to a load. Direct current main 1 is connected to the mid point of winding 5, and main 2 is connected to the cathodes of the valves, so that the current impulses supplied to winding 5 will flow in opposite directions therethrough.

The valves are controlled by means of voltages applied to their grids which are supplied from the secondary winding 6. The connections for this purpose include a grid transformer having a primary winding 7, connected across the terminals of winding 6. The terminals of the secondary winding 8 of the transformer are connected to the grids of valves 3 and 4 through resistances 9 and the mid point of the secondary winding 8 is connected to the cathodes of valves 3 and 4 through a reactance 10, and a resistance 11.

The frequency of the impulses produced in the primary winding 5 are controlled by means of an impedance comprising a reactance 12 saturable in response to a predetermined condition of said circuit, and a variable resistance 13 connected across the terminals of winding 7. By varying the resistance 13 the frequency of the alternating current produced may be controlled in a manner which will presently be set forth.

In order that the current may start in one valve before it is completely interrupted in the other valve it is necessary that the positive voltages supplied to the grid of the valves should lead the voltages in the secondary winding 6. The desired lead in the present instance is secured by means of a condenser 14 connected to the primary winding 7 by means of a transformer 15.

The operation of the device is as follows:—If the grid of valve 3 is positive, a current will flow through primary winding 5, inducing an electromotive force in winding 6. Since winding 7 is connected across winding 6 a current will flow in 7 which will cause an electromotive force to be induced in winding 8, producing in this manner a positive potential on the grid of valve 3 and a negative potential on the grid of valve 4. As the reactance 12 approaches saturation the drop across it is rapidly reduced, and by the time saturation is effected, winding 7 will be in effect short circuited, and the voltage across windings 7 and 8 will be reduced to zero. Reactance 10 will now act in a well known manner to maintain a positive potential on the grid of valve 3 and to produce a positive potential on the grid of valve 4. Both valves now become conducting with the result that the drop across windings 5 and 6 is reduced to zero. The flux in reactance 12 now decreases, causing a reverse current flow in winding 7 and impressing an electromotive force in the opposite direction on winding 8. The grid of valve 3 now becomes negative, and that of valve 4 positive, permitting current to flow through valve 4 and thus completing one half cycle of operation. By increasing or decreasing resistance 13, the time taken to saturate coil 12 may be increased or decreased, thus determining the frequency of the impulses in the output circuit.

While I have shown coil 12 connected in shunt with winding 7, obviously this coil might comprise the primary winding of the grid transformer, or if desired, the control of the frequency might be effected in a similar manner by the control of the saturation of the main transformer, the time it takes to reach the saturation point of the control transformer in each case determining the frequency of the alternating current impulses. The operation in either case is substantially the same as that set forth above.

When the control of the frequency is determined by the control of the primary winding of the grid transformer, the electromotive force induced in winding 8 will be in one direction as the flux increases, and the grid of valve 3 will be positive and the grid of valve 4 negative. At saturation the voltage across winding 8 will be zero and both grids will be positive. As the flux decreases, the electromotive force induced in 8 will be in the opposite direction, and the potential impressed on the grid of valve 3 will be negative and that on grid 4 positive, completing one half cycle as in the previously described operation.

In the operation of the device as above described, a very high voltage will be produced across the terminals of the grid transformer. I have found, however, that this voltage may be substantially reduced by means of condensers 16 and 17 connected between the grid and cathode of each valve.

While I have shown but one organization whereby my invention may be carried into effect various modifications will readily suggest themselves to persons skilled in the art without departing from the scope of my invention.

What I claim as new and desire to secure by Letters Patent of the United States is:—

1. The combination in a system of electrical distribution of a source of direct current, a winding connected to said source through an electric valve, a consumption circuit associated with said winding, and means comprising a reactance saturable in response to a predetermined condition of said circuit and connected between said valve and said circuit for controlling the action of said valve to supply current impulses to said winding.

2. The combination in a system of electrical distribution of a source of direct current, a primary winding connected to said source through an electric valve, a secondary winding inductively associated with the primary winding, means for controlling the action of said valve to supply current impulses to said primary winding and means comprising a reactance saturable in response to a predetermined condition of said circuit for controlling the frequency of said impulses.

3. The combination in a system of electrical distribution of a source of direct current, a primary winding connected to said source through an electric valve, a secondary winding inductively associated with the primary winding, means for controlling the action of said valve to supply current impulses to said primary winding, and a reactance saturable in response to a predetermined condition of said circuit and associated with said controlling means for determining the frequency of said impulses.

4. The combination in a system of electrical distribution of a source of direct current, a primary winding connected to said source through a plurality of electric valves, a secondary winding inductively associated with the primary winding, means comprising a transformer for controlling the action of said valves to supply current impulses to said primary winding, and means comprising a reactance saturable in response to a predetermined condition of said circuit and connected to one of the windings of said transformer for controlling the frequency of said impulses.

5. The combination in a system of electrical distribution of a source of direct current, a primary winding connected to said source through a plurality of electric valves, each valve comprising an anode, a cathode, and a grid member, a secondary winding inductively associated with the primary winding, means comprising a transformer for controlling the action of said valves to supply current impulses to said primary winding, a capacity unit connected between the cathode and grid member of each valve, and means comprising a reactance saturable in response to a predetermined condition of said circuit and associated with said transformer for controlling the frequency of said impulses.

In witness whereof, I have hereunto set my hand this 10th day of February, 1925.

ERNST F. W. ALEXANDERSON.